United States Patent [19]

Czumak

[11] 4,209,235
[45] Jun. 24, 1980

[54] FILM CASSETTE PROCESSOR HAVING CAPILLARY GROOVES
[75] Inventor: Frank M. Czumak, Derry, N.H.
[73] Assignee: Polaroid Corporation, Cambridge, Mass.
[21] Appl. No.: 35,939
[22] Filed: May 4, 1979
[51] Int. Cl.² ............................................. G03C 11/00
[52] U.S. Cl. .................................. 352/78 R; 352/130
[58] Field of Search ........................ 352/130, 78 R, 72
[56] References Cited

U.S. PATENT DOCUMENTS

| Re. 26,324 | 12/1967 | Land . | |
|---|---|---|---|
| 3,473,459 | 10/1969 | Chen et al. . | |
| 3,491,675 | 1/1970 | Gold . | |
| 3,785,725 | 1/1974 | Batter et al. | 352/78 R |
| 3,806,245 | 4/1974 | Land et al. | 352/130 |
| 3,809,465 | 5/1974 | Mason | 352/78 R |

Primary Examiner—Monroe H. Hayes
Attorney, Agent, or Firm—Leslie J. Payne

[57] ABSTRACT

A processor usable in a photographic film cassette, which includes a first chamber from which processing fluid is released to a second chamber for eventual flow through a nozzle opening onto a film strip whenever the cassette is in a processing orientation permitting gravity flow through the nozzle opening. An actuator device extends from the processor interior to its exterior through a passage for releasing the stored fluid from the first to the second chamber and a plurality of capillary grooves are formed in the processor in a region at least in or adjacent said passage to trap therein, by capillary adhesion, preselected quantities of any processing fluid residue. For preventing flow of the residue processing fluid remaining in the processor from travelling through the passage whenever the cassette has orientations other than the processing orientation, the grooves are positioned to be above the processing fluid level just after release thereof from the first chamber to prevent the grooves from interfering with the flow of the fluid during the fluid deposition on the film strip.

9 Claims, 3 Drawing Figures

FILM CASSETTE PROCESSOR HAVING CAPILLARY GROOVES

BACKGROUND OF THE INVENTION

1. Field of the Invention

This invention relates to photographic film processing apparatus and, more particularly, it concerns an improved processor which prevent leakage of any residue processing fluid from the interior of the processor.

2. Description of the Prior Art

As a result of recent developments in the motion picture art, motion picture systems have been devised in which exposure, processing and projection operations are carried out on a photographic film strip contained at all times in a multipurpose cassette. Such a system has been disclosed in several U.S. patents, assigned in common with the present invention. In these cassettes a supply of light sensitive film can be exposed in a camera adapted to receive the cassette. Processing or developing of the exposed film, to provide the conventional series of positive transparent image frames, is achieved by merely placing the cassette in a player or processing and viewing apparatus capable of activating a processor contained in the cassette. During the processing mode, the exposed film is rewound and a coating or layer of processing fluid from the processor is deposited along the length of the film. After processing in this manner, the player apparatus is operated as a projector to advance the film incrementally, frame by frame, past a light source. As a result, the scene to which the film was exposed is capable of being reproduced on a screen.

While the advance in the motion picture art represented by such a system is apparent and needs no elaboration herein, it is critical to satisfactory performance of the system that the processing fluid not leak. Failure to prevent leakage will damage the cassette interior, including the film strip. Thus, undesirable blemishes may be observed in the film's images during projection thereof. It follows, therefore, that prevention of processing fluid leakage is a significant point of attention in overall system development.

The current state of the art with respect to preventing such leakage is represented by the disclosure of U.S. Pat. No. 3,785,725 issued Jan. 15, 1974 to John F. Batter, Jr., Paul B. Mason, Joseph A. Stella, Paul W. Thomas, Jr. and Joseph H. Wright; and U.S. Pat. No. 3,806,245 issued Apr. 23, 1974, to Edwin H. Land and John Batter, Jr. which patents are commonly assigned with the present application.

In the disclosures of these patents, a pad of sponge-like material is used to prevent leakage. Such pad is wettable and swellable by the cassette contained processing fluid, and is positioned to engage any residue fluid trying to escape through a passage in the processor, which passage permits withdrawal of the tear-tab during the tear-tab release. Thus, any residue processing fluid contacting the sponge causes expansion of the sponge pad to seal the passage against escape of the processing fluid.

While the foregoing approach successfully operates to seal the residue processing fluid against escape there are, however, potential for operational problems. One is the fact that if tiny sponge particles exist they can fall into the fluid and adversely affect the processing fluid coating of the film. Further drawbacks with the foregoing approach are that the sponge pad is relatively costly and must be carefully manufactured and assembled into the cassette. Moreover, some approaches required more than a single pad for leakage prevention.

As will later be explained, the illustrated embodiment employs capillary grooves to control the residue fluid; however, it is known to provide minute V-shaped energy directors along the length of certain margins of the processing well cover to facilitate ultrasonically welding the cover to the cassette wall formations to thereby retain the processor pod and released processing fluid. Such energy directors, incidentally, result in the formation of grooves. However, the energy-directors and grooves are not situated to control and inhibit the residual fluid through the passage and are not dimensioned to trap the processing fluid through capillary adhesion.

SUMMARY OF THE INVENTION

A fluid processor in accordance with the invention includes a first chamber constructed to store processing fluid, a second chamber to which the processing fluid may be released to flow through a nozzle opening of the processor for deposition onto a film strip, a passage constructed and arranged to permit displacement of means for releasing the stored fluid for flow to the second chamber and capillary grooves located in or adjacent the passage. In an illustrated embodiment, the grooves are dimensioned and configured to trap, by capillary adhesion, preselected quantities of processing fluid residue remaining after release and deposition of the processing fluid. In this manner, the grooves prevent escape of the fluid through the passage whenever the cassette has orientations enabling gravity flow of the fluid to and through the passage.

Advantageously, the grooves are positioned to be above the operating level of the processing fluid just after release thereof from the first chamber when the cassette is in its processing orientation so as to prevent the grooves from trapping the fluid during deposition of the fluid on the film thereby optimizing the amount of the fluid available for deposition.

Among the objects of the invention are, therefore, the provision of an improved processor for film strips contained in multipurpose film cassettes which substantially eliminates leakage of the processing fluid residue from the processor.

Other objects and further scope of applicability of the present invention will become apparent from the detailed description to follow when taken in conjunction with the accompanying drawings in which like parts are designated by like reference numerals.

DETAILED DESCRIPTION OF THE PREFERRED EMBODIMENT

Figure 1:
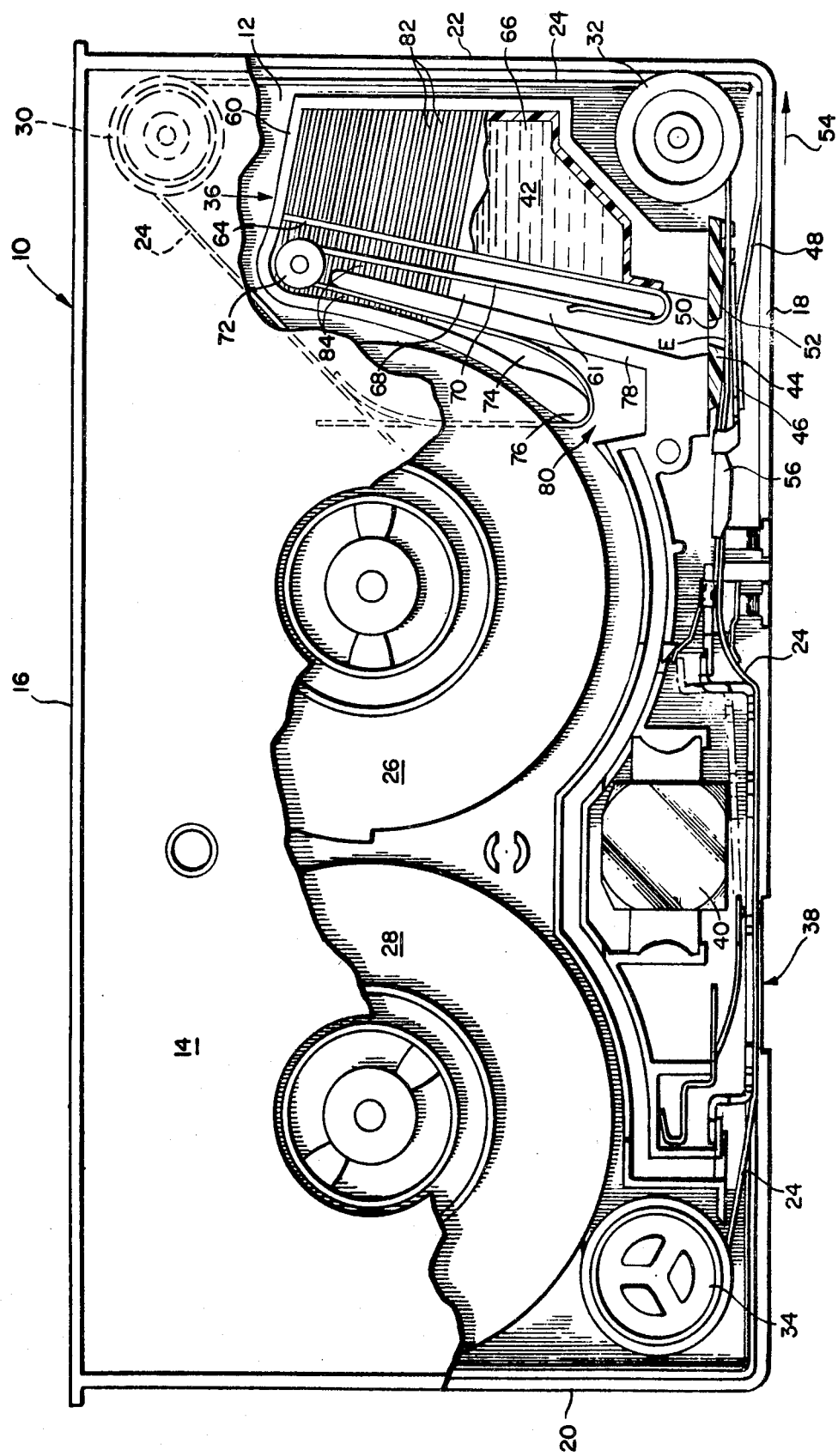
FIG. 1 is a side elevation view, partially broken away and partially in cross section, illustrating the interior arrangement of a photographic film cassette incorporating the improvements of the present invention.

In FIG. 1 of the drawings a multipurpose film cassette incorporating the present invention is shown to include a cassette housing generally designed by the reference numeral 10.

In this embodiment, the cassette housing 10 takes the form of a rectangular parallelepiped having a pair of exterior side walls 12 and 14 connected together by top, bottom and end walls 16, 18, 20 and 22, respectively. Within the housing 10, a film strip 24 is connected at opposite ends to supply and take-up spools 26 and 28, respectively, for movement through a series of linear flights or runs defined by a bobulator roller 30, an idler or guide roller 32 and a snubber roller 34. When the film strip 24 runs between the guide roller 32 and snubber roller 34, in passing from the supply spool 26 to the take-up spool 28, it traverses an improved processor 36 and an exposure/projection aperture 38 formed in the bottom housing wall 18 under a reflecting prism 40 located adjacent ventilating openings in the side wall 12. The processor 36 retains the processing fluid 42.

In accordance with the disclosure of prior patents, including the one mentioned above, as the film strip 24 runs between the rollers 32 and 34, it passes between the bottom of an applicator nozzle 44 and a pressure pad 46 biased upwardly by a spring 48 supported in the bottom wall 18.

Figure 2:
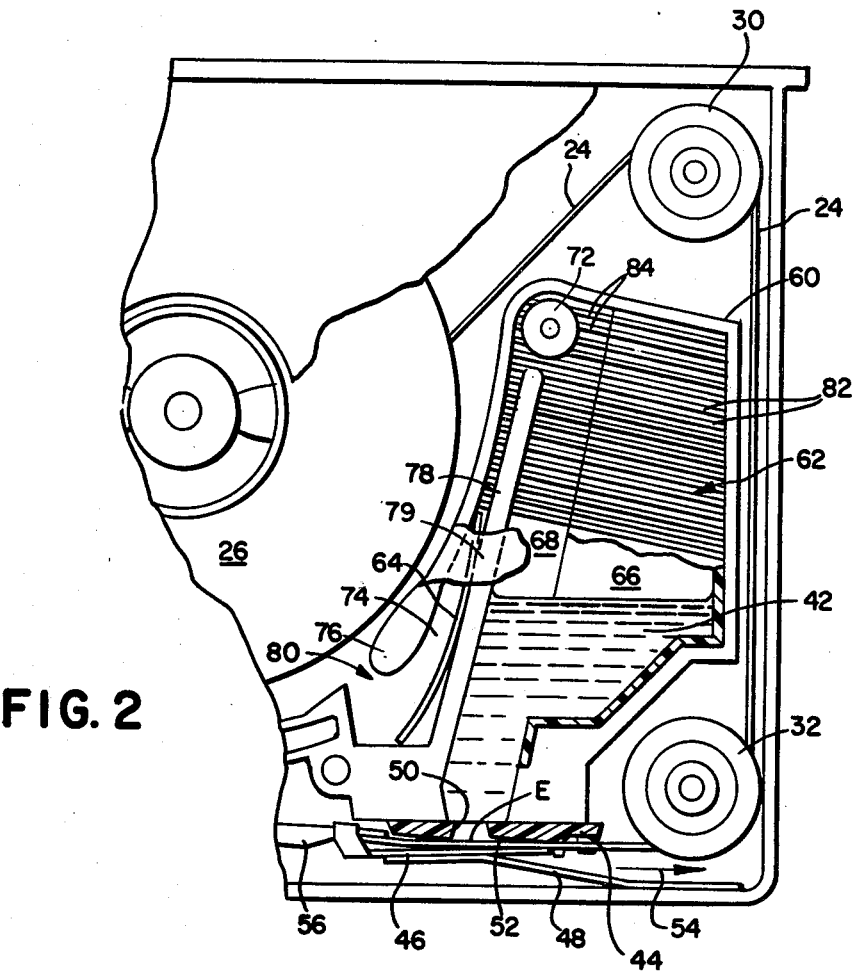
FIG. 2 is an enlarged diagrammatic view, partly in cross section, illustrating the formation and orientation of the capillary grooves in the processor.

Referring back to the nozzle 44, it is an integral molding of a suitable synthetic resinous material. Extending through the nozzle 44 from top to bottom is a generally rectangular shaped nozzle opening 50 through which the processing fluid 42 is deposited onto the emulsion layer E. With particular reference to FIG. 2, it will be seen that the nozzle 44 is also formed with a sloped doctoring surface 52 shown to be located downstream of the nozzle opening 50; as viewed in the context of film strip advancement in the processing or rewind direction as indicated by arrow 54. The doctoring surface 52 terminates above the layer E by a preselected distance. As a result of the above relationship of the doctoring surface 52 to the film strip 24 there is developed a desired positive hydrodynamic pressure gradient in the processing fluid 42 traveling therepast which increases in the rewind direction 54 of film strip advancement. Owing to this arrangement, the processing fluid 42 is spread substantially uniformly across the emulsion layer E between the longitudinal margins of the film strip 24.

With reference again to the spring 48 it is specifically designed so that the emulsion layer E of the film strip 24 is slidably engaged on the underside of the nozzle 44 even during development of hydrodynamic forces in processing fluid 42 which tend to urge the film strip 24 and the pressure pad 46 away from the nozzle. As a result of this, a net balance of forces on the film strip 24 is achieved, whereby foreign particles such as dust or the like, on the surface of the emulsion layer E will effect a slight instantaneous increase in the gap between a doctoring surface 52 and the emulsion layer. Such increase allows the foreign particles to pass beneath the doctoring surface 52. Positioned upstream of the nozzle 44 (in the context of film strip travel during rewinding) is a valve member 56. To be advanced from the position shown to a position, not shown, underlying the nozzle 44 at the end of the processing cycle, the valve member 56 is engageable by a necked-down portion, not shown, in the leading end portion of the film strip 24.

Turning back to the processor 36, such is seen to include internal transverse retaining wall formation 60 which defines an enclosed pod well area 61 suitably sized for snuggly receiving a processing fluid pod or reservoir 62. For reasons subsequently made clear the pod 62 has a transverse dimension less than that of the wall formation 60. The pod 62 is made of a suitable plastic material and retains the processing fluid 42. For sealing the processing fluid 42 in the pod 62 there is provided a generally elongated and peelable tear strip 64. In the assembled condition the tear strip 64 defines a first chamber 66, storing the processing fluid 42 during the inoperative mode of the processor, and a second chamber 68, in direct communication with the nozzle opening 60 for allowing fluid released from chamber 66 to flow to such opening. Secured as by bonding to the bottom of the tear strip 64 is a pull strip extension 70.

It is pointed out that the construction and operation of the tear strip 64 and pull strip 70 is adequately disclosed in the aforementioned patents. Therefore, only details of the tear strip and pull strip arrangement needed for a proper understanding of this invention will be discussed.

The pull strip 70 extends upwardly from the connection with the tear strip 64 about a guide roller 72 and downwardly through a passage or channel 74 defined, in part, by wall formations 76 and 78. A processing well cover 79 is suitably secured to the wall formations 60 so as to retain the pod 62 and processing fluid 42. It should be mentioned that the second chamber 68 includes the space surrounding the pod 62 when the latter is assembled between the side wall 12 and the well cover 79. Since the pod 62 has a width less than the wall formation 60. An exit opening 80 for the channel 74 is formed in the wall 76 for allowing displacement of the pull strip 70 therethrough. As best shown in FIG. 1, the pull strip 70 extends upwardly from the exit 80 and has a necked-down portion (not shown) constructed to engage with an aperture (not shown) formed in the leader of the film strip 24 so as to be displaced by the latter. As a result of such engagement and displacement and displacement, the pull strip 70 is correspondingly displaced to thereby peel the tear strip 64 off the pod 62. This, of course, allows flow of the processing fluid 42 to the chamber 68 and eventually to the nozzle opening 50. Continued displacement of the pull strip 70 causes continued peeling of the tear strip 64 until the latter travels around the guide roller 72 and into passage 74, whereby a blade formation (not shown) separates it from the pull strip 70.

Figure 3:
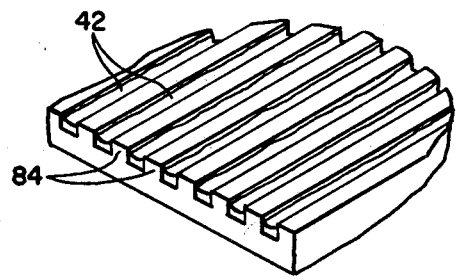
FIG. 3 is an enlarged and fragmented perspective view of the capillary grooves containing processing fluid.

To prevent any residue of the processing fluid 42 from leaking through the passage 74 there are provided a plurality of capillary grooves 82 formed into the upper half of the exterior of the pod 62 as well as a plurality of capillary slots or grooves 84 formed in and extending generally across the upper half of the pod well area 61. As best shown in FIG. 2, the capillary grooves 84 are generally aligned with the capillary grooves 82 and both are dimensioned to trap any processing fluid residue from reaching passage 74. Also, the channel 74 is formed with the grooves 84 so as to further inhibit and prevent flow of the processing fluid 42 therethrough. Advantageously, the grooves 82 and 84 are positioned to be above the top level of the fluid 42 after release thereof, such as shown in FIG. 2, so as to avoid unnecessarily retaining the processing fluid otherwise usable for deposition during the processing mode and thereby optimizing the amount available for deposition. The grooves 82 and 84 may be formed by molding or the like and are dimensioned to trap the fluid 42 through capillary adhesion. Such dimensions may vary depending upon the density and wettability of the processing fluid 42. Relatively larger dimensioned grooves are used for processing fluid having relatively lower density and relatively smaller dimensioned grooves are used for relatively higher density processing fluid. The trapping ability of the grooves 82 and 84 is by virtue of the adhesion created by the noted dimensioning. Thus, the grooves are dimensioned to provide for the necessary capillary adhesion. As best shown in FIG. 3, the grooves 82 as well as, for that matter, the grooves 84 have a square shaped cross-section. Moreover, V-shaped grooves are usable.

It should be pointed out that the processing fluid 42 normally flows in the direction of the nozzle opening 50. However, after the cassette housing 10 is removed from the player apparatus, the cassette housing 10 may assume configurations other than that depicted. For instance, the cassette housing 10 may become inverted relative to the position depicted in FIGS. 1 and 2. Consequently, whatever residue remains in the first and second chambers 66 and 68, respectively, after processing will flow by gravity toward and into the passage 74. But as noted, the capillary grooves 82 and 84 are configured to trap this residue and thereby provide trapping means which is extremely simple to manufacture and which simultaneously avoids the necessity and expense of conventional sponge inserts. Moreover, the capillary grooves 82 and 84 have the attendant benefit of substantially eliminating the potential of sponge debris falling into the processing fluid 42 during processing.

It is believed that the operation of the improved cassette of the present invention is obvious based on the foregoing description. However, to supplement such description it will be understood that the cassette is placed within a camera (not shown) adapted to receive and operate the same. Operation of the camera will result in the film strip 24 being incrementally advanced from the supply spool 26 past the pressure pad 46 and the aperture opening 38 to the take-up spool 28. After film strip exposure, the cassette is inserted in a specially constructed player apparatus such that it has the orientation depicted in FIGS. 1 and 2. Such player apparatus is operable in either a processing mode or a projecting mode and equipped with means cooperable with the various operating components of the cassette to operate the latter in such modes.

Assuming the exposed film strip 24 has not been processed, the player is operated so that the pull strip 70 becomes engaged by an aperture (not shown) in the trailing end leader of the film strip 24 to pull the tear strip 64 away from the pod or reservoir 62. As a result, the processing fluid 42 flows from the chamber 66 to the chamber 68 and through the nozzle opening 56. At the completion of tear strip removal, the pull strip 70 becomes wound between the convolutions of the film strip 24 wrapped on the supply spool 26. As a result of the processing fluid 42 flowing through the nozzle opening 50, the emulsion layer E will have deposited thereon such fluid.

Assuming that the cassette housing 10 has been removed from the player and its orientation reversed from that depicted, then any residue of the processing fluid 42 will flow towards the guide roller 72 and the pasage 74. Interposed in the path of such travel are the capillary grooves 82 and 84 which by virtue of their dimensions serve to trap the processing fluid 42 therein. Consequently, leakage of the processing fluid 42 is inhibited or is substantially eliminated.

Thus it will be appreciated that as a result of this invention, an improved processor is provided for photographic film strip cassettes by which the above-mentioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a film cassette containing a strip of photographic film movable in a given direction, a fluid processor defining a first chamber constructed to store processing fluid and a second chamber communication with the first chamber and into which the processing fluid is released for deposition onto the film strip by gravity through a nozzle opening in the processor whenever said cassette is in a processing orientation, the processor having a passage extending from an interior thereof to an exterior thereof, and an actuator for releasing the processing fluid from the first chamber to the second chamber, the improvement comprising:

a plurality of capillary grooves formed in said processor and positioned in or adjacent a region at least substantially surrounding an internal opening of said passage, said grooves dimensioned and configured to trap, by capillary adhesion, any residue processing fluid and thereby inhibit flow thereof into said passage whenever the cassette has orientations other than the processing orientation for enabling flow of the fluid by gravity towards said passage.

2. The cassette of claim 1 wherein said grooves are positioned to be above the initial level of the processing fluid after release thereof from the first chamber to thereby prevent trapping therein the processing fluid during fluid deposition on the film, whereby the amount of the processing fluid available for deposition is optimized.

3. The cassette of claim 1 wherein said passage has an opening formed on the exterior of said processor and said grooves are formed in said passage intermediate said exterior passage opening and said internal passage opening.

4. The cassette of claims 2 or 3 wherein said grooves are correspondingly dimensioned to trap particular types of processing fluid having a particular predetermined density and wettability.

5. The cassette of claim 4 wherein said grooves have a generally square-shaped configuration.

6. In a film cassette having a housing containing a strip of photographic film movable in a given direction, a fluid processor member, defining a first chamber and being able to store processing fluid, said housing having a compartment for receiving said pod and defining a second chamber surrounding said processor member into which the processing fluid is released for deposition onto the film strip by gravity through a nozzle opening formed in said housing whenever said cassette has a processing orientation enabling the gravity flow, said housing having a passage extending from an interior of said first chamber to an exterior thereof, and actuating means movable in said passage for releasing the fluid to said second chamber, the improvement comprising:

a plurality of capillary grooves formed in said housing and positioned in or adjacent a region at least substantially surrounding an internal opening of said passage and a plurality of capillary grooves formed on the exterior surface of said processor member in said compartment and positioned in a region at least adjacent said internal opening of said passage, said grooves dimensioned and configured to trap therein by capillary adhesion preselected quantities of the processing fluid to thereby inhibit flow of a residue amount of processing fluid remaining into said passage whenever said cassette has orientations other than the processing orientation for enabling gravity flow of the fluid towards said passage.

7. The cassette of claim 6 wherein said grooves are positioned to be above the initial level of the processing fluid level after release thereof from the chamber to thereby avoid unnecessarily trapping the processing fluid during deposition, whereby the amount of the flow available for deposition is optimized.

8. In a fluid processor for use with a photographic film cassette containing a photographic film movable in a given direction, said fluid processor defining a first chamber constructed to store processing fluid and a second chamber into which the processing fluid may be released for deposition onto the film strip by gravity through a nozzle opening formed in said processor whenever said cassette is in a processing orientation enabling the gravity flow, said processor having a passage extending from an interior of said processor to an exterior thereof and actuating means movable in said passage for releasing the fluid to said second chamber, the improvement comprising:

a plurality of capillary grooves formed in said processor and positioned in or adjacent an internal entrance of said passage, said grooves dimensioned and configured to trap therein, by capillary adhesion any residue processing fluid to thereby inhibit flow of the fluid into said passage whenever said cassette has orientations other than the processing orientation, enabling gravity flow of the fluid towards said passage.

9. The processor of claim 8 wherein said grooves are positioned above the initial level of the processing fluid level after release thereof from the first chamber to prevent said grooves from interfering with the fluid deposition thereby optimizing the amount of the fluid available for deposition.

* * * * *